Patented June 17, 1930

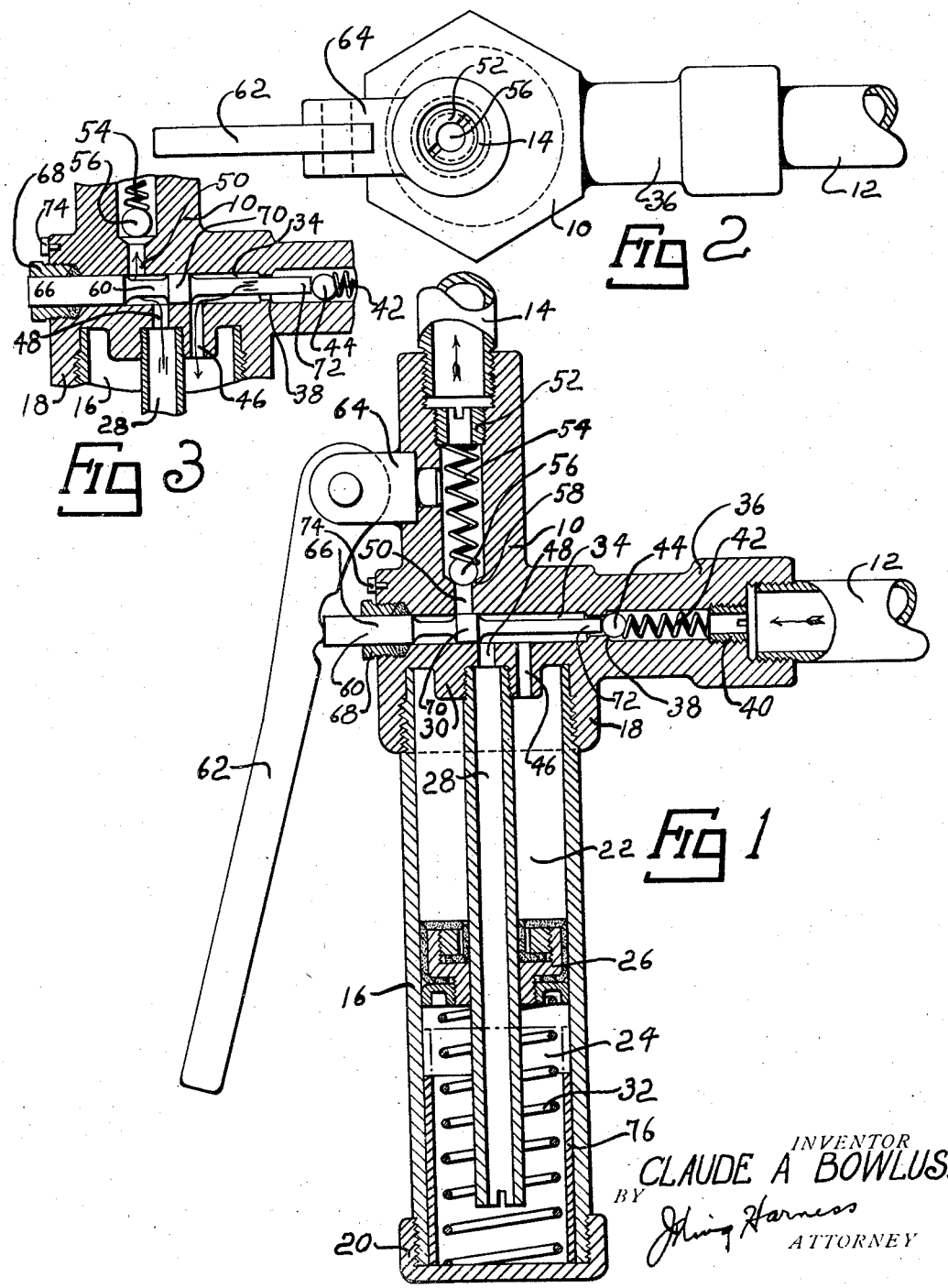

1,764,823

UNITED STATES PATENT OFFICE

CLAUDE A. BOWLUS, BIRMINGHAM, MICHIGAN

LUBRICATING DEVICE

Application filed June 16, 1927. Serial No. 199,313.

This invention relates to a metering device and more particularly to a device for supplying predetermined quantities of lubricant under pressure to parts to be lubricated.

An important object of the invention is to provide a device in which a single control is adapted to admit lubricant under pressure to the metering device and that same pressure, while being admitted, is used to force the metered lubricant from the device.

Another object is to provide means for supplying lubricant under pressure to an expansible chamber; the expansion of which causes lubricant in an adjacent chamber to be forced out of the device. The expansion of the last named chamber causes the lubricant forced into the first named chamber to enter the last named chamber to be again forced out of the device. The valves for directing such flow of lubricant are controlled by a single operating device which when operated causes the device to function in the manner described. Certain features, hereinafter more fully described have been provided for determining the amount of lubricant to be forced out of the chamber.

A further object of the invention is to provide a simple, inexpensive and portable device for supplying predetermined quantities of lubricant to parts to be lubricated which device has a single manual control for measuring the amount of lubricant and supplying it under pressure to the parts to be lubricated.

Other objects and advantages will more fully appear from the following description in connection with the accompanying drawings in which:

Fig. 1 is a sectional view showing my improved device with the valves in a position for supplying lubricant from one chamber to the other.

Fig. 2 is an end view of Fig. 1.

Fig. 3 is a fragmentary view of Fig. 1 showing the valves in a position for admitting lubricant to one chamber and for forcing it out of the other chamber.

Referring to the drawings, wherein a preferred form of my invention has been illustrated, a body portion 10 having an inlet passage 12 and an outlet passage 14 is provided with a cylindrical portion 16. To reduce the cost of manufacture the cylindrical portion 16 is made from tubing and screw threaded into a boss 18 on the body portion 10. The outer end of the tube is closed by a screw threaded cap 20 forming a chamber which is divided into an upper chamber 22 and a lower chamber 24 by a conventional piston 26. Communicating with the lower chamber 24 and in axial alignment therewith is a tubular member 28 which is screw threaded in a boss 30 on the body portion 10. The piston 26 reciprocates on the rod 28 and is sealed with respect thereto as well as with the inner wall of the tube 16. A spring 32 urges the piston 26 toward the body portion 10 reducing the size of the chamber 22 and increasing the size of the chamber 24.

A transverse bore 34 is formed in the body portion 10 and extends thru a projection 36 which receives the inlet passage 12 connected to any convenient source of lubricant supply under pressure. A valve seat 38 is formed in the bore 34 and a hollow screw threaded member 40 secures a spring 42 and ball 44 within the outer end of the bore 34. The spring 42 together with the pressure of the lubricant holds the ball 44 against its seat 38. There are two passages leading from the bore 34, one 46 forming a communication between the upper chamber 22 and the bore 34 and the other 48 forming a communication between the lower chamber 24 and the bore 34 thru the tube 28.

A passage 50, out of alignment with the passage 48, forms a communication between the bore 34 and the outlet passage 14. A hollow screw-threaded member 52 secures a spring 54 and ball 56 within the outlet passage. The spring 54 resiliently urges the ball 56 against a seat 58.

Mounted in the bore 34 is a rod 60 which is reciprocated by a handle 62 pivoted to a support 64 on the body portion 10. The rod has two portions which closely fit the wall of the bore 34; the outer portion 66 forming a bearing or guide in a packing gland 68 and the inner portion 70 forming a valve to close the passage 50 when the rod is in the position shown or to close the communication between the openings 46 and 48 when the rod is in operating position, shown in Fig. 3. The small end 72 of the rod 60 is adapted to unseat the ball 44 to admit the lubricant under pressure.

A stop 74 has been provided to limit the movement of the handle 62 so that the rod 60 will not go beyond the position shown in Fig. 3. A sleeve 76 has been provided in the lower chamber 24 which limits the downward movement of the piston 26. This sleeve may be replaced with a longer or shorter sleeve to thereby determine the amount of movement and consequently the amount of lubricant supplied.

In the operation of the device the rod 60 is pushed down, as shown in Fig. 3, and the lubricant under pressure flows into the bore 34, thru passage 46 and into the upper chamber 22. As the pressure builds up in this chamber it is expanded by forcing the piston downwardly causing the lubricant in the lower chamber 24 to be forced, by that same pressure, through the tube 28, passage 48, into that portion of the bore 34 between the enlarged portions 66 and 70 and thence through the outlet passage 50 unseating the valve 56 by the pressure of the lubricant. When the piston 26 reaches the sleeve 76 its movement is stopped and the lubricant ceases to be discharged thru the outlet passage with the handle remaining in its down position. When the handle is released the rod 60 assumes the position shown in Fig. 1 and by the return movement of the piston 26, forced upwardly by the spring 32, the lubricant in the upper chamber is forced thru the passage 46, bore 34, passage 48, tube 28 and into the lower chamber 24 ready for the next supply.

It will be understood that the device will operate if the valves 44 and 56 are omitted. In such a design, when the enlarged portion 70 is in a position as shown in Fig. 1, the pressure from the source of supply is equally applied to both sides of the piston 26 and the spring 32 causes the piston to rise the same as though the valve 44 was used.

It is to be understood that while I have limited the description to a device for supplying lubricant, other fluids such as air or liquid may be used without departing from the spirit of my invention. Changes in detail, size and arrangement of parts may be made without limiting my invention other than by the terms of the appended claims.

What I claim is:

1. In a device of the class described comprising a body portion having an inlet passage and an outlet passage, a cylinder adapted for communication with said inlet passage and said outlet passage, a piston in said cylinder between said inlet passage and said outlet passage, a reciprocating valve when in one position for directing a flow of fluid into said cylinder on one side of said piston to cause it to force a fluid on the other side of said piston through said outlet passage and when in another position to form a communication between the portions of the cylinder at the opposite sides of the piston and means for returning said piston.

2. In a device of the class described, comprising, a body portion having an inlet passage and an outlet passage, a cylinder adapted for communication with said inlet passage and said outlet passage, a piston in said cylinder between said inlet passage and said outlet passage, manually controlled means when in one position for directing a flow of fluid into said cylinder on one side of said piston to cause it to force a predetermined amount of fluid on the other side of said piston through said outlet passage and when in another position to form a communication between the portions of the cylinder at the opposite sides of the piston and means for returning said piston.

3. In a device of the class described comprising, a body portion having a bore adapted for communication with an inlet passage and an outlet passage, a pair of chambers formed by a reciprocating member between said inlet passage and said outlet passage, each of said chambers having a passage communicating with said bore, and through the bore, with each other and a reciprocating valve in said bore to close the outlet passage when in one position and adapted to close the communication between chambers when in another position.

4. In a device of the class described comprising, a body portion having a transverse bore adapted for communication with an inlet passage and an outlet passage, a cylinder carried by said body portion having a passage communicating with said bore, a piston in said cylinder, a spring for urging said piston toward said passage, a tube carried by said body portion in axial alignment with said cylinder and extending thru said piston, said tube having a passage communicating with said bore, a manually controlled valve in said bore for closing said outlet passage and forming a communication between the passages leading to said cylinder and said tube, and means for moving said valve to a position for forming a communication between said outlet passage and the passage leading to said tube simultaneously closing the communication between said cylinder and said tube, and forming a communication between said cylinder and said inlet passage.

CLAUDE A. BOWLUS.